United States Patent
Lection et al.

(10) Patent No.: US 9,571,971 B2
(45) Date of Patent: Feb. 14, 2017

(54) MANAGING CROWD SOURCED DATA ACQUISITION

(71) Applicant: INTERNATIONAL BUSINESS MACHINES CORPORATION, Armonk, NY (US)

(72) Inventors: David B. Lection, Raleigh, NC (US); Mark B. Stevens, Austin, TX (US); John D. Wilson, Houston, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/696,170

(22) Filed: Apr. 24, 2015

(65) Prior Publication Data
US 2016/0316333 A1    Oct. 27, 2016

(51) Int. Cl.
*H04W 4/02* (2009.01)

(52) U.S. Cl.
CPC .............. *H04W 4/023* (2013.01); *H04W 4/028* (2013.01)

(58) Field of Classification Search
CPC ..... H04W 4/023; H04W 4/028; H04L 43/045; H04N 5/23206; H04N 5/77; G06T 2219/024; G06T 17/20; G06T 19/20; G06T 2219/028; G06T 17/00; G06T 19/006; G06T 17/30873; G06T 17/30268
See application file for complete search history.

(56) References Cited

U.S. PATENT DOCUMENTS

| | | | |
|---|---|---|---|
| 5,574,979 A | 11/1996 | West | |
| 8,526,329 B2 | 9/2013 | Mahany et al. | |
| 2004/0151396 A1* | 8/2004 | Nomura | G06T 7/0081 382/254 |
| 2007/0140662 A1* | 6/2007 | Nunomaki | G11B 27/105 386/224 |
| 2008/0077597 A1 | 3/2008 | Butler | |
| 2010/0197239 A1 | 8/2010 | Catovic et al. | |
| 2011/0191052 A1 | 8/2011 | Lin et al. | |
| 2012/0315884 A1* | 12/2012 | Forutanpour | H04W 4/026 455/414.2 |
| 2012/0315992 A1* | 12/2012 | Gerson | A63F 13/12 463/42 |

(Continued)

OTHER PUBLICATIONS

"An Application that Allows a Mobile Device User to Locate Another Mobile Device User if Both Users Have GPS Support", Oct. 31, 2005, published on IP.com, IPCOM000130646D.

(Continued)

*Primary Examiner* — Dinh P Nguyen
(74) *Attorney, Agent, or Firm* — Paul S. Drake

(57) ABSTRACT

A system or computer usable program product for providing improved coverage of data acquisition in a crowd sourced data acquisition environment including determining respective locations of mobile devices within an area wherein data acquisition is desired; requesting transmission of desired data captured by sensors in the mobile devices within the area; comparing locations of mobile devices currently transmitting desired data to a desired coverage map of mobile device location to produce a map showing missing coverage; prioritizing acquisition of mobile devices in locations of missing coverage; and aggregating the transmitted desired data and providing the aggregated data to an entity.

19 Claims, 6 Drawing Sheets

(56) References Cited

U.S. PATENT DOCUMENTS

2013/0222369 A1* 8/2013 Huston .................. G06T 17/00
                                                        345/419
2013/0286238 A1* 10/2013 Tan ........................ H04N 5/77
                                                        348/222.1

OTHER PUBLICATIONS

"Device Controlled HO optimization based on historical knowledge", Sep. 28, 2007, Siemens AG and Juergen Carstens, Nokia Siemens Networks, published on IP.com, IPCOM000158683D.
"Method and System for Rendering Simplified Content on Mobile Devices", Feb. 10, 2011, published on IP.com, IPCOM000204076D.
"Motivation of Crowds: The Incentives That Make Crowdsourcing Work", Jan. 31, 2008, Peter Organisciak, found on the internet at: http://crowdstorming.wordpress.com/2008/01/31/motivation-of-crowds-the-incentives-that-make-crowdsourcing-work/.
"Extrinsic, Intrinsic, and Social Incentives for Crowdsourcing Development Information in Uganda: A Field Experiment", May 24, 2012, Findley et al, found on the internet at: http://web.archive.org/web/20121004123203/http://www.aiddata.org/weceem_uploads/_ROOT/File/Crowdsourcing%20Field%20Experiment%20Uganda.24May2012.pdf.
"Digitalkoot: crowdsourcing Finish Cultural Heritage", Feb. 8, 2011, Tommaso De Benetti, found on the internet at: http://blog.microtask.com/2011/02/digitalkoot-crowdsourcing-finnish-cultural-heritage/.
"A Perfect Fit: Geolocation Services and Entertainment Venues", Oct. 26, 2010, ThunderTix.com, found on the internet at: http://www.thundertix.com/ticket-trends/a-perfect-fit-geolocation-services-and-entertainment-venues/.
"An Oddly Addictive New Social Network for TV Fanatics", Mar. 12, 2012, June Thomas, Slate.com, found on the internet at: http://www.slate.com/blogs/browbeat/2012/03/12/getglue_an_oddly_addictive_new_social_network_for_tv_fanatics.html.
"Waze Keeps You Out of Traffic, as GPS meets the Power of the Crowd", Aug. 21, 2012, Frederick E. Allen, Forbes, found on the internet at: http://www.forbes.com/sites/frederickallen/2012/08/21/ditch-your-gps-device-navigate-with-waze/.
"Dynamic pricing incentive for participatory sensing", Sep. 1, 2010, Lee et al, Pervasive and Mobile Computing, vol. 6, issue 6, pp. 693-708.
"List of IBM Patents or Patent Applications Treated as Related" dated Jul. 28, 2016, including U.S. Appl. No. 14/833,228, filed Aug. 24, 2015.

* cited by examiner

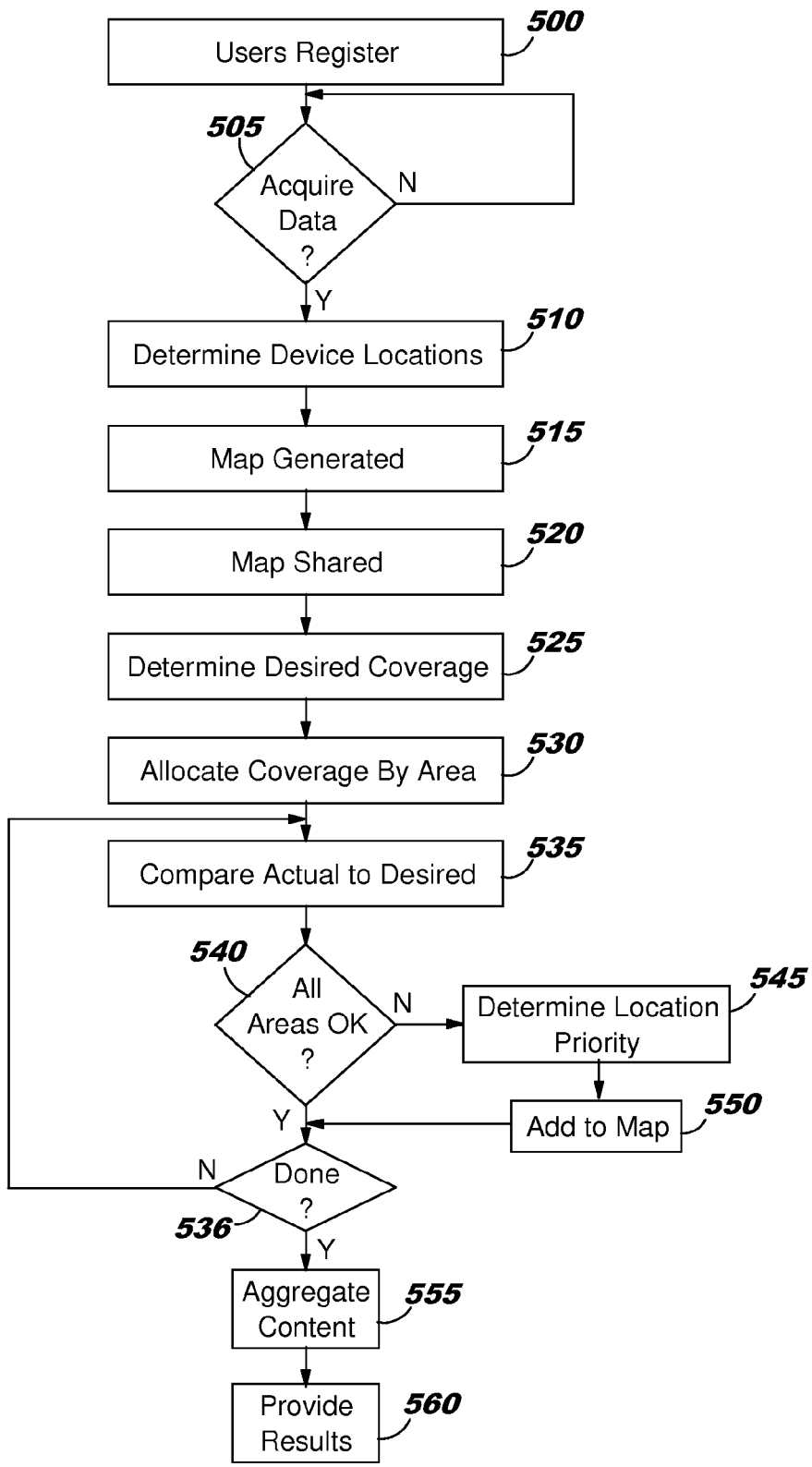

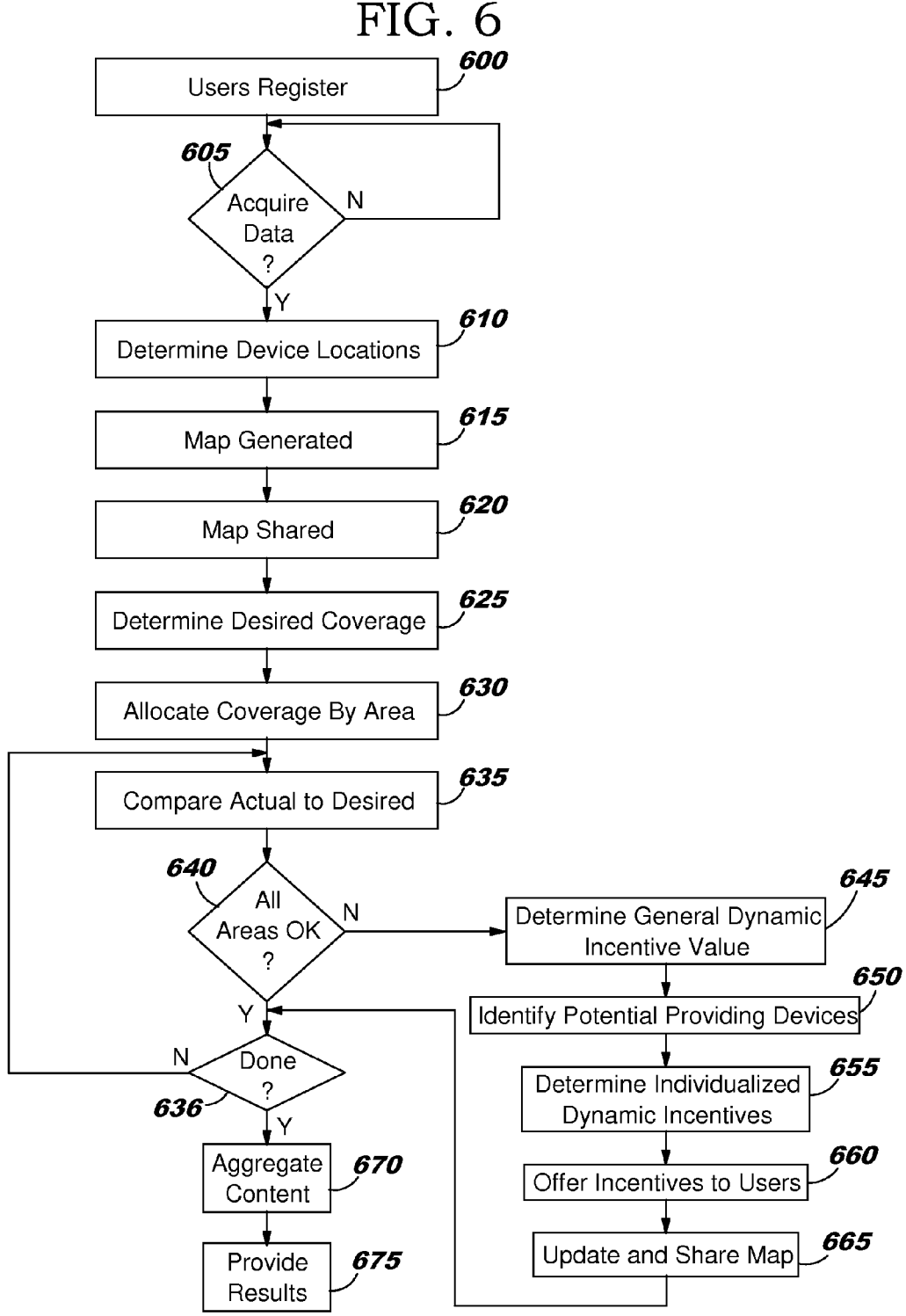

MANAGING CROWD SOURCED DATA ACQUISITION

BACKGROUND

1. Technical Field

The present invention relates generally to crowd sourced data acquisition, and in particular, to a computer implemented method for dynamically prioritizing acquisition of mobile devices in desired locations for managing crowd sourced data acquisition.

2. Description of Related Art

With the proliferation of mobile devices, the amount of data being collected by individuals has increased exponentially. This includes images and video as well as other types of data collection such as traffic congestion, weather information, gas prices, etc. Collectively, this data collected by users on their mobile devices can be utilized for a variety of purposes such as for mapping congestion on roadways. This uploaded data may be stored in centralized servers in discrete bundles or across multiple servers (and often locations) as cloud storage managed by a hosting company. This allows the uploaded data to be handled collectively from a centralized system.

SUMMARY

The illustrative embodiments provide a system and computer usable program product for providing improved coverage of data acquisition in a crowd sourced data acquisition environment including determining respective locations of mobile devices within an area wherein data acquisition is desired; requesting transmission of desired data captured by sensors in the mobile devices within the area; comparing locations of mobile devices currently transmitting desired data to a desired coverage map of mobile device location to produce a map showing missing coverage; prioritizing acquisition of mobile devices in locations of missing coverage; and aggregating the transmitted desired data and providing the aggregated data to an entity.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 5 is a flow diagram of managing crowd sourced data acquisition in accordance with a first embodiment; and FIG. 6 is a flow diagram of utilizing dynamic incentives for managing crowd sourced data acquisition in accordance with a second embodiment.

DETAILED DESCRIPTION

Processes and devices may be implemented and utilized for dynamically prioritizing acquisition of mobile devices in desired locations for managing crowd sourced data acquisition. These processes and apparatuses may be implemented and utilized as will be explained with reference to the various embodiments below.

Figure 1:
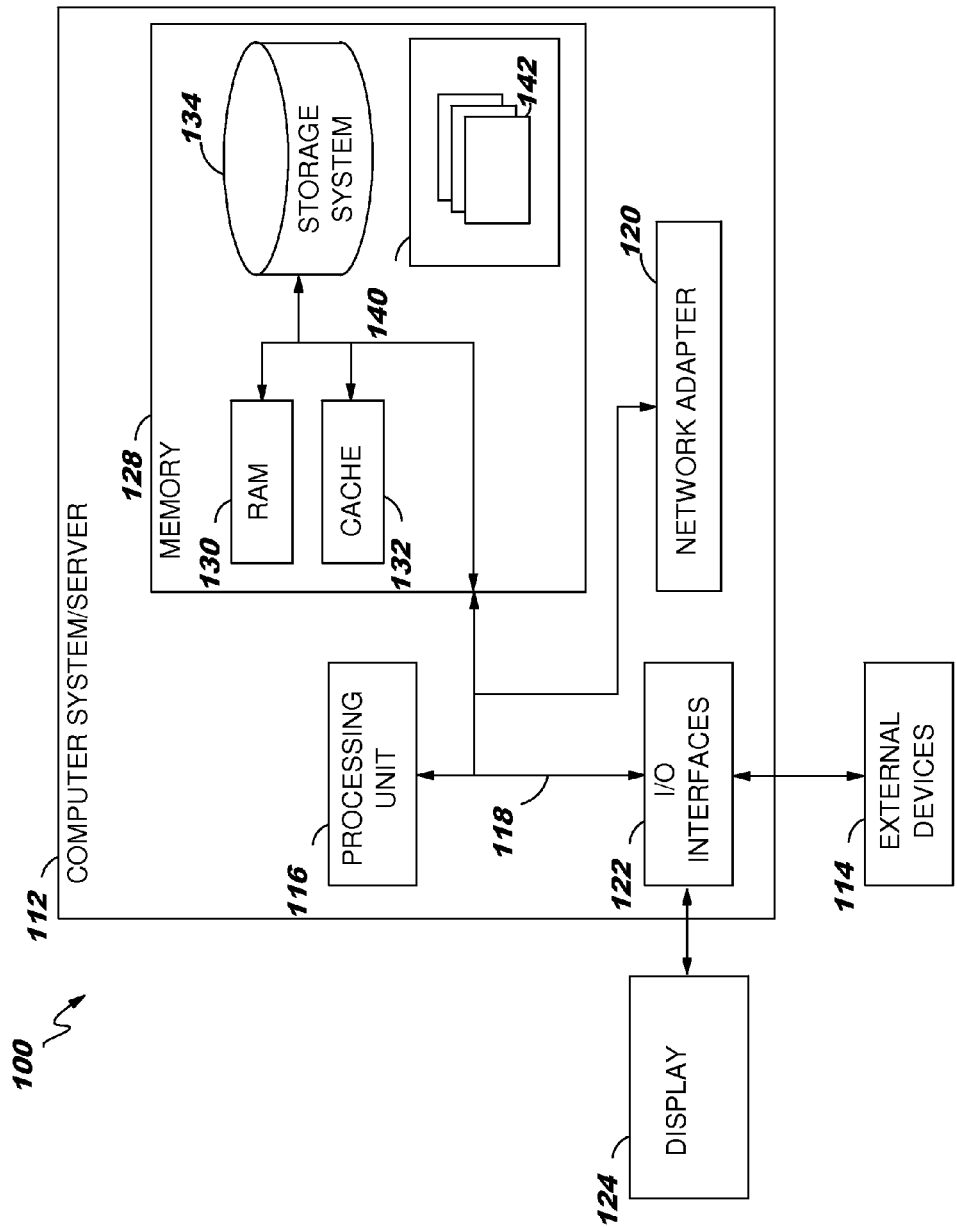
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as dynamically prioritizing acquisition of mobile devices in desired locations for managing crowd sourced data acquisition.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for dynamically prioritizing acquisition of mobile devices in desired locations for managing crowd sourced data acquisition.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
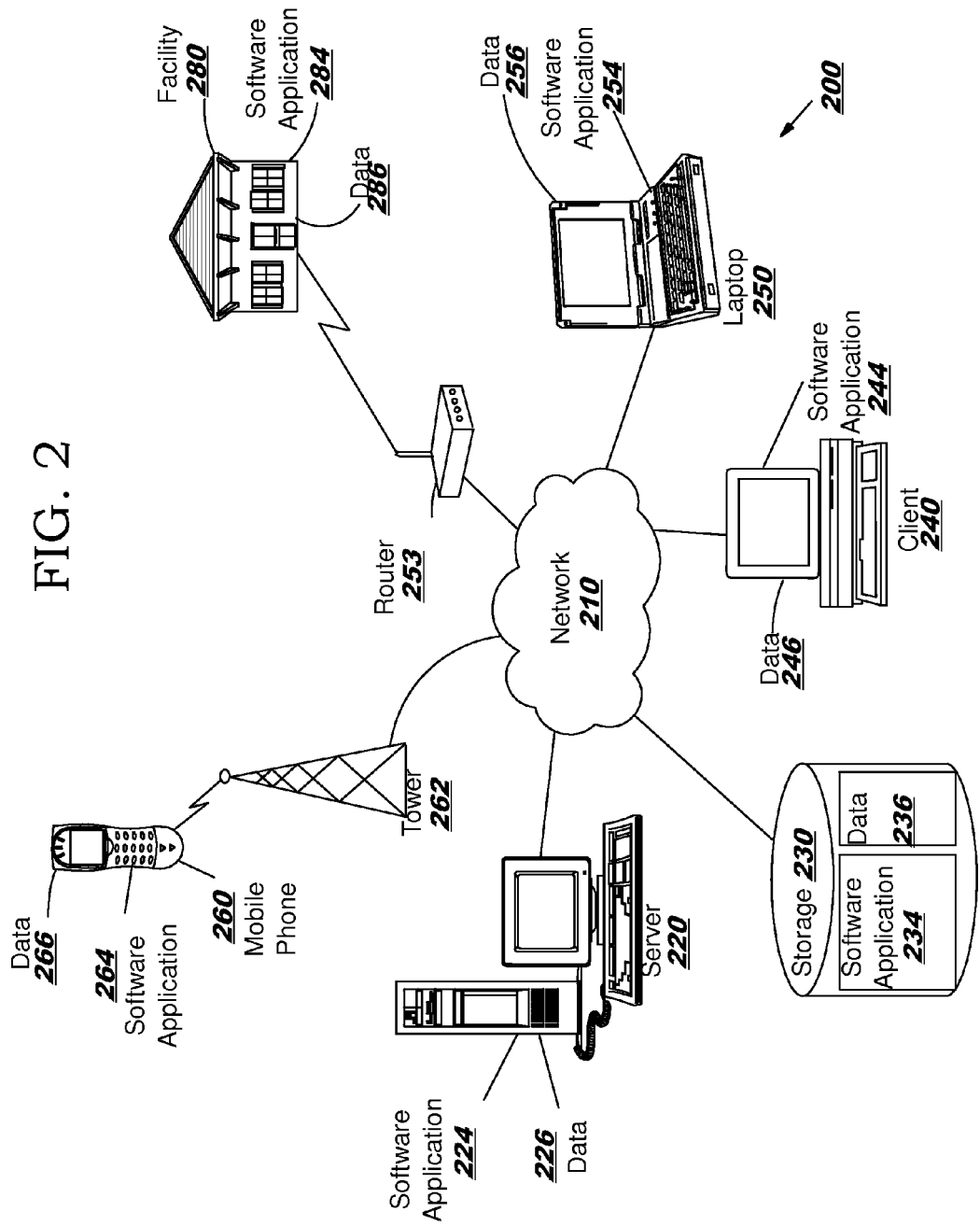
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for dynamically prioritizing acquisition of mobile devices in desired locations for managing crowd sourced data acquisition may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for dynamically prioritizing acquisition of mobile devices in desired locations for managing crowd sourced data acquisition or other software applications and data in accordance with embodiments described herein. Storage 230 may contain software application 234 and a content source such as data 236 for dynamically prioritizing acquisition of mobile devices in desired locations for managing crowd sourced data acquisition. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application for dynamically prioritizing acquisition of mobile devices in desired locations for managing crowd sourced data acquisition.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3A:
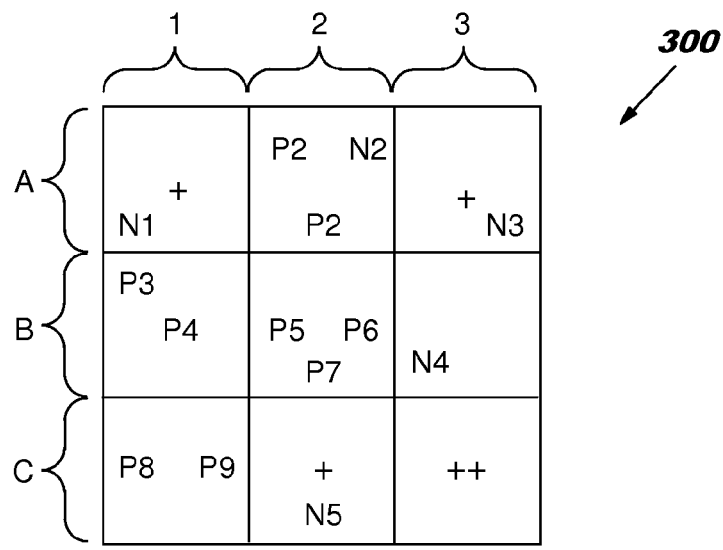
FIGS. 3A-3C are diagrams of maps utilized for managing devices for data acquisition in which various embodiments may be implemented.
Figure 3B:
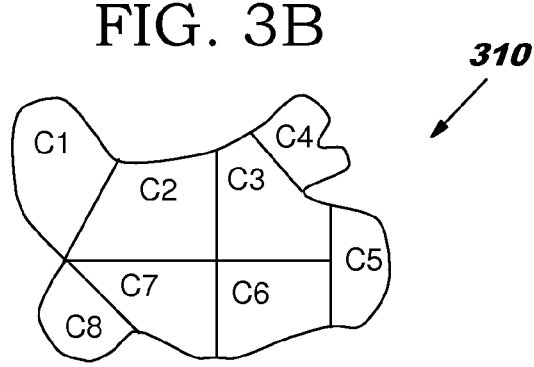
Figure 3C:
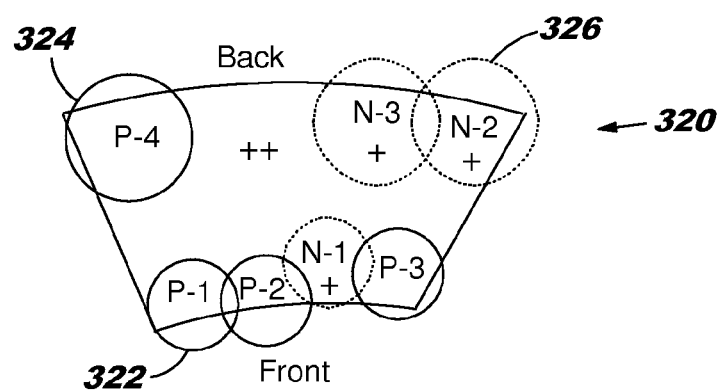

FIGS. 3A-3C are diagrams of maps utilized for managing devices for data acquisition in which various embodiments may be implemented. FIG. 3A is a grid map 300 of an area where locations of providing devices (P1-P9) and other non-providing devices (N1-N5) are shown. Presumably, each device has a corresponding user that is utilizing that device. A device which is providing data (also referred to herein as content) to a repository is considered a providing device and a device which is not providing data to a repository is a non-providing device. If multiple repositories are obtaining data concurrently, a device may be a providing device for one repository and a non-providing device for the other repository. These devices are typically mobile devices where the location of that device varies. Each mobile device is suitable for providing desired data (i.e., content) for acquisition and for providing a current location of that device. Content can include images, video, audio, sensor data, air quality, traffic congestion, weather information, gas prices, etc.

Grid map 300 is broken into 3 rows (A, B and C) and three columns (1, 2 and 3) or 9 cells (A1-C3) where providing devices and other non-providing devices and their corresponding users may be located. This grid map may be a map of an urban area, a rural area, a concert venue, a building floor, etc. In this example, at least one providing device is desired for each area. As shown in FIG. 3A, there are providing devices for cells A2, B1, B2, and C1). As a result, providing devices are desired for cells A1, A3, B3, C2 and C3. There are other non-providing devices in cells A1, A3, B3 and C2. However, there is no device in cell C3. As a result, those cells with the greatest need for providing devices are the highest priority indicated with a ++ symbol and those with a lower need for providing devices are a lower priority and are indicated with a + symbol. Many more levels of prioritization can be utilized. Incentives may be provided to non-providing devices in a desired cell to become a providing device, or the incentives may be provided to providing devices to move to a desired cell. For example, N1 may receive a small incentive (corresponding to +) to become a providing device in cell A1. Also, providing devices P1, P2, P3 and P4 may receive incentives to move to cell A1. These incentives may be provided to all users of devices, whether providing or not, or they may be limited to those users of devices in the proximate area of the desired cell. Non-providing devices may receive the incentive before providing devices receive the incentive, or conversely, providing devices may receive the incentive first. Incentives or other compensation may be higher for a grid cell without any device coverage than a grid cell with some user coverage. That is, larger incentives (corresponding to ++) may be provided in cells where there are no devices (e.g., cell C3)

Although grid map 300 is shown as a square grid, other types of maps and cells may be utilized. For example, the map may be composed of hexagonal cells, triangular cells, or other type of regular cell shape. Irregular cells may also be utilized. The map may also be irregular in shape such as the shape of a city limits or a baseball park. The locations of providing and other non-providing devices may be shown on each of these types of maps.

FIG. 3B is a map 310 of a city or other irregular shaped area for data acquisition. Map 310 is divided into regions shown as cells C1-C8. Providing and non-providing devices could be shown with priorities as illustrated in FIG. 3A above. As shown, each region or cell is irregular in shape and delineated by borders. Some regions or cells are larger than others. Some regions may be sized based on a variety of factors such as population density, distance from a central location, statistical significance to a data item of interest, etc.

FIG. 3C is a map 320 of a venue or other type of area for data acquisition. In this case, map 320 is not divided into cells. Instead, each providing device (P-1 through P-4) is identified with a range or sphere of data collection such as range 322 for providing device P-1. This range may be smaller for providing devices near the front of the venue and larger for those in the back of the venue such as range 324 for providing device P-4. The size of the range may be static for all locations or it may vary based on proximity to an area of focus (e.g., a performing group at the front of the venue), statistical significance, or other factor. The range may be circular, spherical, square, triangular or other shape including irregular depending on the application and the local environment. The range for other non-providing devices may also be shown with dotted lines to show their potential range such as range 326 for non-providing device N-2. Incentives may be utilized to incentivize users of devices to provide coverage of high priority areas (++) not currently covered by the range of providing devices. This can include incentivizing non-providing devices to become providing devices and for selected providing devices to move to a location to provide coverage for areas not currently covered by the range of providing devices.

Figure 4:
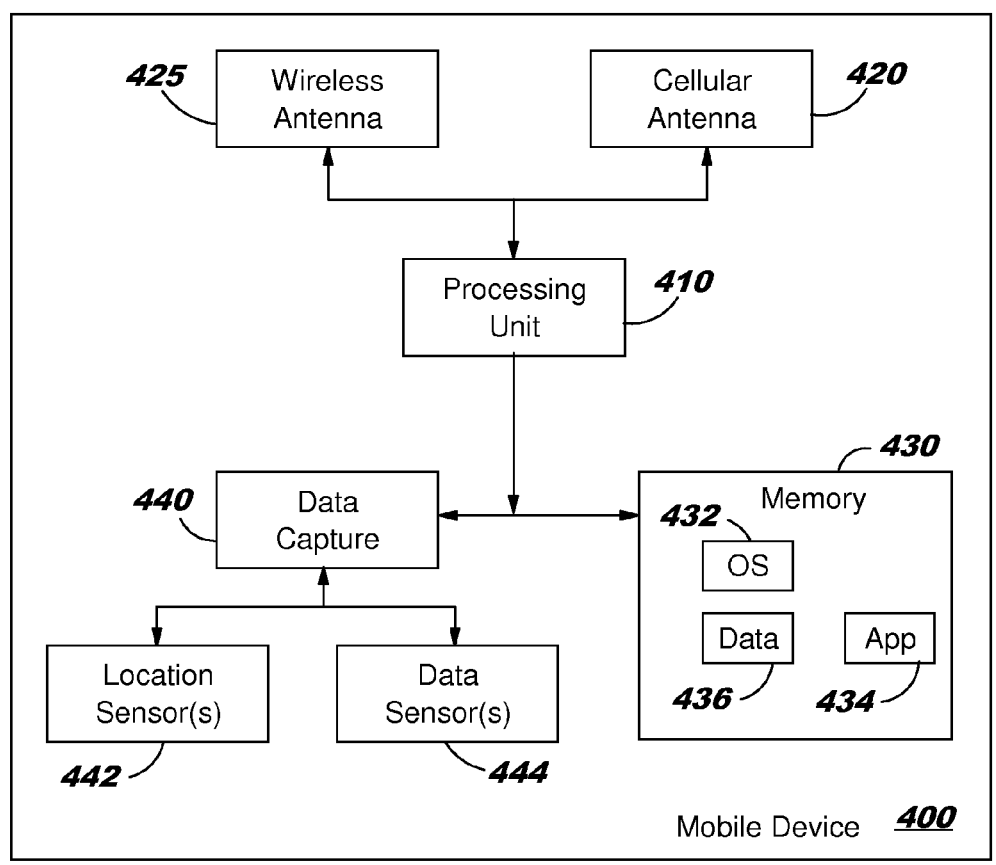
FIG. 4 is a block diagram of a mobile device which may be utilized for acquiring data in which various embodiments may be implemented.

FIG. 4 is a block diagram of a mobile device which may be utilized for acquiring data in which various embodiments may be implemented. Mobile device 400 includes a processing unit 410, which may be a single processor or multiple processors working together to manage and perform the functions of the mobile device. Processing unit 410 communicates through cellular antenna 420 and wireless antenna 425 with other devices. For example, cellular antenna 420 may be utilized to communicate with a cellular tower. Wireless antenna 425 may be utilized to communicate with a wireless router or other devices including mobile devices. Other types of antennae may be utilized to communicate with a variety of other devices, such as to provide a connection to the internet or to a server for uploading desired data. Other types of connections may also be utilized such as a USB wired connection to a laptop or other device.

Processing unit 410 utilizes memory 430 for instructions and data. For example, processing unit 410 utilizes general operational instructions from operating system (OS) 432 stored in memory 430. Specific program such as App (application) 434 also provide more specific instructions for processing unit 410. For example, App 434 may be a specific application for acquiring data and for uploading that data to a centralized system such as a server. App 434 can be downloaded by a user onto mobile device 400 by a user to potentially provide data for acquisition by a centralized service. App 434 can also provide location information regarding the mobile device to the centralized service either continuously, periodically, upon a prompt, or combination thereof. Data 436 includes data stored in memory from a variety of sources, including desired data for uploading upon request, user preferences, and historical data such as for dynamically generating incentives.

Processing unit 410 also communicates through data capture unit 440 with a variety of sensors including location sensor(s) 442 and data sensor(s) 444. The data captured by data capture unit 440 can be stored in memory 430 and/or uploaded to a centralized system. Location sensor(s) 442 can include GPS (global position system) sensors which obtain signals from GPS satellites (or other type of global positioning system). Location sensor(s) can also determine the location of the mobile device through a variety of other signals such as triangulating using cellular tower signals, triangulating using Wi-Fi signals, etc. User input could be utilized to identify the location of the user's device. For example, the user could also be queried as to his or her location, such as by asking what seat he or she is in at a theatre. Data sensor(s) 444 can include a wide variety of sensors including microphones to detect sound, photosensors to detect light including a camera with a lens, a thermometer to detect temperature, a capacitive humidity sensor to detect humidity, a barometric sensor to detect air pressure, a particulate sensor to detect pollen or pollution, a Geiger counter to detect radiation, a mass spectrometer to identify substances, etc. As a result, mobile device 400 can be utilized for acquiring a wide range of data from any desired location accessible by a user of that mobile device.

FIG. 5 is a flow diagram of managing crowd sourced data acquisition in accordance with a first embodiment. This example assumes that multiple mobile devices have downloaded a specific application or program useful for acquiring crowd sourced data (also referred to herein as crowd sourced content or content) and that the user of the device has registered with a centralized service for acquiring crowd sourced data (step 500). Alternatively, the device may be registered during the application downloading process or the user may register without downloading an application. Various messages may be utilized to encourage users to move to higher priority areas or to turn their device from a non-providing device to a providing device. These messages could be through a note or map sent through the registered application, through a text message, through an email, etc. Users may respond to these message for a variety of reasons including altruistic reasons or for informational purposes. For example, registered users may receive a summary of the crowd sourced data (i.e., for informational purposes).

Then in step 505, a centralized service (e.g., a central server) determines whether certain desired crowd sourced data should be acquired from a specific area (i.e., also referred to therein as a region or locale) environmentally suitable for crowd sourced data acquisition. This may be sound or visual data from a concert venue, pollution data (e.g., noise, particulate, etc.) from a city or other locale, temperature data from a region, etc. This determination could be based on an entity requesting such data or from identifying multiple sources of similar data being uploaded from a specific locale. If a positive determination in step 505, then processing continues to step 510, otherwise processing returns to step 505 to repeat that process until a determination for gathering crowd sourced data is made.

In step 510, the location of all (or many) providing devices and non-providing devices within the region of interest are identified. This location information may be maintained constantly by the mobile devices or it may be acquired upon a prompt from the centralized service. At this point there may not be any providing devices, although some users may constantly provide this type of data regardless of whether there is a current interest in that data or not. For example, some people may constantly or at least periodically capture and upload pollution data to ascertain their daily exposure to certain pollutants.

In step 515, a coverage map of the locations of the various providing devices and non-providing devices is generated. This coverage map of user locations should also include the source of the data to be acquired, if available. For example, if sound from a concert is being sampled through crowd sourced data, the location of the stage may be shown on the map. However, if the source of the data is not known or cannot be readily ascertained, such as temperature, then obviously it cannot be shown on the map. Then in step 520, the map can optionally be shared with the users. It may be shared only with providing devices and the shared map may only include the location of those providing devices. At this point, the map does not include priorities as they have not been ascertained yet. However, this allows the users to see that crowd sourcing of data is beginning and their location within that effort. If shared with non-providing devices, some of them may start providing that data. Also, some users may move locations on their own based on observed needs.

In step 525, the centralized service determines a desired coverage needed for crowd sourcing the desired data. This can include statistical analysis of currently received data as well as any historical data. For example, a high amount of data variation may require additional sampling through crowd sourced data to achieve a desired statistical confidence in the acquired data results. This desired coverage may also require an enlargement or reduction in the general area to be sampled. Then in step 530, this desired coverage is allocated by area (i.e., region) such as with a set of desired crowd sampling positions (i.e., user locations). For example, a grid may be utilized with a desired number of samples within each grid space. The desired number of samples (e.g., providing devices) within an area or region may differ based on distance from the data source or other factors.

Subsequently in step 535, the desired number of samples or providing devices is compared to the actual number of providing devices within each area or region based on the coverage map of user locations. In step 540, it is determined whether all areas or regions have the appropriate number of providing devices. If yes in step 540, then processing proceeds to step 536. Otherwise, processing continues to step 545. In step 536, it is determined whether the sampling or capturing of content is complete. If no in step 536, processing returns to step 535 as a feedback loop to continue checking whether the number of providing devices continues to meet the desired numbers by area or region. If yes in step 536, then processing proceed to step 555. Optionally, if there are changes to the desired coverage, such as by request of the requesting entity, then processing can return to step 525.

In step 545, a dynamic priority value for adding providing devices to the desired number is determined for each area or region. This dynamic value can be weighted or otherwise based on the value of desired data in an area or region to the centralized service, on the expected time or cost to encourage the desired number of providing devices to that area or region based on the available providing and non-providing devices nearby (e.g., weighted based on the location and number of providing and non-providing devices), on the length of time since any movement of providing devices, or a combination of these and other factors. This dynamic priority value can be modified over time based on changes (or lack of changes) to these factors. This dynamic priority value for each area or region may be as a level, points, or other measure Then in step 550, the dynamic priority for each area or region is added to the coverage map to show missing coverage. The updated map, including current locations of users, is then broadcast to the providing and non-providing devices. This allows each user of a non-providing device to determine based on these dynamic priorities whether to become a providing device and it allows users to determine whether they want to move to a different location as a providing device. Various techniques for encouraging and discouraging users can be utilized. For example, more frequent and possibly urgent messages could be sent to the devices in a higher priority area and offers to join the group of mobile devices could be ignored from devices in areas which are well represented. If the users gave the device application prior permission, devices in missing areas could simply be added.

After a period of time, processing then returns to step 536 as a feedback loop to determine whether the dynamic priorities should be modified (increased or reduced) based on an updated number of providing devices for a given area or region.

In step 555, the results of the acquisition of captured and forwarded content is aggregated. This aggregation may include generating statistical measures such as averages and measures of dispersion, including confidence intervals. Other types of aggregation may be utilized, such as may be requested by a requesting entity. Then in step 560, the aggregated data is then transmitted or otherwise provided to an entity such as the requesting entity. Steps 555 and 560 may also be performed while the content is being captured and forwarded, such as in a stream of aggregated data. Raw data may also be provided to the requesting entity.

The priorities offered on the map are dynamic because they will be modified over time in a feedback loop based on the need for providing devices in certain areas or regions. This provides flexibility in encouraging users to provide desired sample data within desired areas or regions. Alternatively, dynamic incentives can be generally offered to users of devices to further encourage movement to desired areas. These dynamic incentives for each area or region may be monetary, points, airline miles, etc. or combination thereof. The incentive value may also be simply monetary that is readily converted to points, airline miles, etc. Other types of incentives such as reserved seating for a particular area of a concert venue, post event access to performers, discounts on relevant goods, etc. may be included. Examples of dynamic incentives that are more user specific are described below with reference to FIG. 6.

FIG. 6 is a flow diagram of utilizing dynamic incentives for managing crowd sourced data acquisition in accordance with a second embodiment. This example assumes that multiple mobile devices have downloaded a specific application or program useful for acquiring crowd sourced data (also referred to herein as crowd sourced content or content) and that the user has registered with a centralized service for acquiring crowd sourced data (step 600). Alternatively, the device may be registered during the application downloading process or the user may register without downloading an application. Users may do this for a variety of reasons including in response to incentives or simply for altruistic reasons. For example, a registered user may receive a summary of the crowd sourced data (i.e., for informational purposes). The user may be offered many types of incentives such as recognition, monetary awards such as micro-payments, coupons, free advertising such as free advertising time on partnered applications, discounted air time, points, awards, discounts at local retailers, airline miles, etc.

Then in step 605, a centralized service (e.g., a central server) determines whether certain desired crowd sourced data should be acquired from a specific area (i.e., also referred to therein as a region or locale) environmentally suitable for crowd sourced data acquisition. This may be sound or visual data from a concert venue, pollution data (e.g., noise, particulate, etc.) from a city or other locale, temperature data from a region, etc. This determination could be based on an entity requesting such data or from identifying multiple sources of similar data being uploaded from a specific locale. If a positive determination in step 605, then processing continues to step 610, otherwise processing returns to step 605 to repeat that process until a determination for gathering crowd sourced data is made.

In step 610, the location of all (or many) providing devices and non-providing devices within the region of interest are identified. This location information may be maintained constantly by the mobile devices or it may be acquired upon a prompt from the centralized service. At this point there may not be any providing devices, although some users and their devices may constantly provide this type of data regardless of whether there is a current interest in that data or not. For example, some people may constantly or at least periodically capture and upload pollution data to ascertain their daily exposure to certain pollutants.

In step 615, a coverage map of the locations of the various providing devices and non-providing devices is generated. This coverage map of device locations should also include the source of the data to be acquired, if available. For example, if sound from a concert is being sampled through crowd sourced data, the location of the stage may be shown on the map. However, if the source of the data is not known or cannot be readily ascertained, such as temperature, then obviously it cannot be shown on the map. Then in step 620, the map can optionally be shared with the users. It may be shared only with providing devices and the shared map may only include the location of those providing devices. At this point, the map does not include incentives as they have not been ascertained yet. However, this allows the users to see that crowd sourcing of data is beginning and their location within that effort. If shared with non-providing devices, some of their users may start providing that data. Also, some users may move locations on their own based on observed needs.

In step 625, the centralized service determines a desired coverage needed for crowd sourcing the desired data. This can include statistical analysis of currently received data as well as any historical data. For example, a high amount of data variation may require additional sampling through crowd sourced data to achieve a desired statistical confidence in the acquired data results. This desired coverage may also require an enlargement or reduction in the general area to be sampled. Then in step 630, this desired coverage is allocated by area (i.e., region) such as with a set of desired crowd sampling positions (i.e., device locations). For example, a grid may be utilized with a desired number of samples within each grid space. The desired number of samples (e.g., providing devices) within an area or region may differ based on distance from the data source or other factors.

Subsequently in step 635, the desired number of samples or providing devices is compared to the actual number of providing devices (those users currently capturing and forwarding content or otherwise uploading that data to the centralized service) within each area or region based on the coverage map of user locations. In step 640, it is determined whether all areas or regions have the appropriate number of providing devices. If yes in step 640, then processing proceeds to step 636. Otherwise, processing continues to step 645. In step 636, it is determined whether the sampling or capturing of content is complete. If no in step 636, processing returns to step 635 as a feedback loop to continue checking whether the number of providing devices continues to meet the desired numbers by area or region. If yes in step 636, then processing proceed to step 670. Optionally, if there are changes to the desired coverage, such as by request of the requesting entity, then processing can return to step 625.

In step 645, a general dynamic incentive value for adding providing devices to the desired number is determined for each area or region and added to the coverage map to show missing coverage. This dynamic value can be weighted or otherwise based on a the value of desired data in that area or region to the centralized service, on the expected cost to incentivize the desired number of providing devices to that area or region based on the available providing and non-providing devices nearby (e.g., weighted based on the location and number of providing and non-providing devices), on the length of time since any movement of providing devices, or a combination of these and other factors. This dynamic incentive value can be modified over time and added to the coverage map based on changes (or lack of changes) to these factors.

Then in step 650, potential providing devices are identified for those areas or regions with a shortage of providing devices. These can be providing devices in adjoining or proximate areas or regions, non-providing devices in those areas or regions, and non-providing devices in adjacent proximate areas or regions. Then in step 655, individualized dynamic incentives are determined for the potential providing devices. These individualized dynamic incentives can be based on user preferences, historical information regarding potential providing devices, etc. For example, one potential user may prefer airline miles where another potential user may have a history of responding to discounts at certain restaurants. That is, the general dynamic incentives are individualized for each prospective user of a providing device to increase the likelihood of success and to reduce overall costs as well as other factors. These individualized dynamic incentive values for each user of a potential providing device may be monetary, points, airline miles, discounts, etc. or combination thereof. The incentive value may also be simply monetary that is readily converted to points, airline miles, etc. Other types of incentives such as reserved seating for a particular area of a concert venue, post event access to performers, discounts on relevant goods, etc. may be included.

Another type of dynamic incentive may be offered. For example, not all mobile devices are identical. Some mobile devices may have greater capabilities such as a higher resolution still camera or video camera. Where there is an identified need for one or more mobile devices with greater capabilities, then special invitations, messages or dynamic incentives may be offered. For example, a better seat or reserved location in a concert where the seat has better connectivity so the user can better utilize his or her device for data capture and uploading or have a better view, some sort of recognition of the user, special access to a resulting combined video with other videos of the same event, a monetary incentive, other incentives known to be desirable for that user, or a combination of any of the foregoing.

Then in step 660, the individualized dynamic incentives are offered to each user of a potential providing device. For example, a current providing device in an adjoining area may be offered and individualized dynamic incentive to move to the desired area. In another example, a non-providing device in a desired area may be offered an individualized dynamic incentive to become a providing device within that area. This allows each user of a non-providing device to determine based on these dynamic incentives whether to become a providing device and it allows users to determine whether they want to move to a different location as a providing device. The potential providing devices may receive these offers in sequence or in groups. As potential providing devices accept or reject these offers for a given area, the general dynamic incentive for that area may decrease or increase, thereby affecting individualized dynamic offers for other potential providing devices.

After a period of time, the map is updated with locations of devices, similar to step 625 above, and shared with the devices in step 665. Processing then returns to step 636 as a feedback loop to determine whether the general and individualized dynamic incentives should be modified (increased or reduced) based on an updated number of providing devices for a given area or region.

In step 670, the results of the acquisition of captured and forwarded content is aggregated. This aggregation may include generating statistical measures such as averages and measures of dispersion, including confidence intervals. Other types of aggregation may be utilized, such as may be requested by a requesting entity. Then in step 675, the aggregated data is then transmitted or otherwise provided to an entity such as the requesting entity. Steps 670 and 675 may also be performed while the content is being captured and forwarded, such as in a stream of aggregated data. Raw data may also be provided to the requesting entity.

The individualized incentives offered to each potential providing device are dynamic because they will be modified over time in a feedback loop as well as by device based on the need for providing devices in certain areas or regions and based on each user's individual history and preferences. This provides flexibility in encouraging users to provide desired sample data within desired areas or regions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for dynamically prioritizing acquisition of mobile devices in desired locations for managing crowd sourced data acquisition. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for providing improved coverage of data acquisition in a crowd sourced data acquisition environment, the computer program product comprising a non-transitory computer readable storage medium having program instructions embodied therewith, the program instructions executable by a processing circuit to cause the device to perform a method comprising:
   determining respective locations of multiple mobile devices within an area wherein data acquisition is desired;
   requesting transmission of desired data captured by sensors in the multiple mobile devices within the area;
   comparing multiple locations of mobile devices currently transmitting desired data to a desired coverage map of mobile device locations to produce a map showing missing coverage of desired data captured by sensors within the desired area;
   utilizing statistical analysis to determine a desired coverage needed for crowd sourcing the desired data to generate the desired coverage map;
   prioritizing acquisition of mobile devices in locations of missing coverage to capture the desired data within the desired area; and
   aggregating the transmitted desired data from the multiple locations of mobile devices and providing the aggregated data to an entity.

2. The computer program product of claim 1 further comprising: monitoring locations of mobile devices currently transmitting desired data; and responsive to a change in the locations of mobile devices transmitting desired data, changing the prioritizing acquisition of mobile devices.

3. The computer program product of claim 1 further comprising providing an incentive to mobile devices to capture and transmit the desired data based on the desired coverage map.

4. The computer program product of claim 3 further comprising individualizing the incentive for mobile devices based on the determined mobile device location.

5. The computer program product of claim 4 wherein the incentive is individualized based on user preferences and historical data.

6. The computer program product of claim 1 wherein the prioritization is weighted on the value of desired data in a specific area.

7. A data processing system for providing improved coverage of data acquisition in a crowd sourced data acquisition environment, the data processing system comprising:
   a processor; and
   a memory storing program instructions which when executed by the processor execute the steps of:
   determining respective locations of multiple mobile devices within an area wherein data acquisition is desired;
   requesting transmission of desired data captured by sensors in the multiple mobile devices within the area;
   utilizing the processor to compare multiple locations of mobile devices currently transmitting desired data to a desired coverage map of mobile device locations to produce a map showing missing coverage of desired data captured by sensors within the desired area;
   utilizing statistical analysis to determine a desired coverage need for crowd sourcing the desired data to generate the desired coverage map;
   prioritizing acquisition of mobile devices in locations of missing coverage to capture the desired data within the desired area; and
   aggregating the transmitted desired data in the memory from the multiple locations of mobile devices and providing the aggregated data to an entity.

8. The data processing system of claim 7 further comprising: monitoring locations of mobile devices currently transmitting desired data; and responsive to a change in the locations of mobile devices transmitting desired data, changing the prioritizing acquisition of mobile devices.

9. The data processing system of claim 7 further comprising providing an incentive to mobile devices to capture and transmit the desired data based on the desired coverage map.

10. The data processing system of claim 9 further comprising individualizing the incentive for mobile devices based on the determined mobile device location.

11. The data processing system of claim 7 wherein the prioritization is individualized based on user preferences and historical data.

12. The data processing system of claim 7 wherein the prioritization is weighted on the value of desired data in a specific area.

13. The data processing system of claim 7 wherein the content is selected from a group consisting of images, video, audio, sensor data, air quality, traffic congestion, weather information, and gas prices.

14. The data processing system of claim 9 wherein the incentive is selected from a group consisting of a summary of the crowd sourced data, recognition, monetary awards, coupons, free advertising, discounted air time, points, awards, discounts at local retailers, and airline miles.

15. The data processing system of claim 7 further comprising receiving position information from a plurality of mobile devices by a remote server prioritizing acquisition of mobile devices in locations of missing coverage.

16. The data processing system of claim 7 further comprising utilizing statistical analysis to determine a desired coverage needed for crowd sourcing the desired data to generate the desired coverage map.

17. The computer program product of claim 1 wherein the desired data is selected from a group consisting of images, video, audio, sensor data, air quality, traffic congestion, weather information, and gas prices.

18. The computer program product of claim 3 wherein the incentive is selected from a group consisting of a summary of the crowd sourced data, recognition, monetary awards, coupons, free advertising, discounted air time, points, awards, discounts at local retailers, and airline miles.

19. The computer program product of claim 1 further comprising receiving position information from a plurality of mobile devices by a remote server prioritizing acquisition of mobile devices in locations of missing coverage.

* * * * *